(12) United States Patent
Renke (10) Patent No.: US 8,146,198 B2
(45) Date of Patent: Apr. 3, 2012

(54) DEBRIS REMOVAL APPARATUS FOR A WIPER SYSTEM

(75) Inventor: David T. Renke, Macomb, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 13/004,409

(22) Filed: Jan. 11, 2011

(65) Prior Publication Data

US 2011/0139178 A1    Jun. 16, 2011

Related U.S. Application Data

(62) Division of application No. 11/873,577, filed on Oct. 17, 2007, now Pat. No. 7,891,042.

(51) Int. Cl.
  *B60S 1/34* (2006.01)
  *B60S 1/44* (2006.01)
  *B60S 1/32* (2006.01)
(52) U.S. Cl. ............. 15/250.19; 15/250.001; 318/DIG. 2
(58) Field of Classification Search ............... 15/250.19, 15/250.351, 250.16, 250.001; 318/DIG. 2
See application file for complete search history.

(56) References Cited

U.S. PATENT DOCUMENTS

| | | | | |
|---|---|---|---|---|
| 2,306,980 A * | 12/1942 | Roberts | ....................... | 15/250.19 |
| 2,717,408 A | 9/1955 | Le Page | | |
| 4,866,811 A | 9/1989 | Kuhbauch | | |
| 5,469,595 A * | 11/1995 | Dara | ........................... | 15/250.19 |
| 5,551,116 A * | 9/1996 | DeKelaita | ................... | 15/250.19 |
| 5,636,407 A | 6/1997 | Len | | |
| 5,749,119 A | 5/1998 | Isaac | | |
| 6,438,789 B1 | 8/2002 | Murawa et al. | | |
| 6,453,504 B1 * | 9/2002 | Burkard et al. | .......... | 15/250.003 |
| 6,471,784 B2 | 10/2002 | Lahti | | |
| 6,751,825 B2 | 6/2004 | Zuccaro et al. | | |
| 7,014,717 B1 | 3/2006 | Lahti | | |
| 2009/0100627 A1 | 4/2009 | Renke | | |

FOREIGN PATENT DOCUMENTS

| | | |
|---|---|---|
| CN | 2774866 Y | 4/2006 |
| DE | 716478 | 1/1942 |
| DE | 4235395 | 4/1994 |
| JP | 01-195160 | 8/1989 |
| JP | 06-092203 | 4/1994 |

OTHER PUBLICATIONS

Substitute for unavailable Chinese Office Action dated Jun. 12, 2010: Agent Letter dated Mar. 2, 2010, detailing the Chinese Office Action of Jun. 12, 2010 for Chinese Application 200810149943.5 corresponding the U.S. Appl. No. 11/873,577.
Abstract for Japanese publication 06-092203 published Apr. 1994.

* cited by examiner

*Primary Examiner* — Gary Graham (57) ABSTRACT

An automatic debris removal apparatus for a wiper system that removes soluble and insoluble debris trapped between the wiper blade and the glass surface by lifting the wiper blade off the glass surface and then causing the wiper blade to drop onto the glass surface as a shake under urge of the biasing spring of the wiper arm, so as to thereby provide a shaking action which frees any trapped debris. An actuator selectively interacts with the pivotal portion of the wiper arm to effect shaking of the wiper arm to thereby free the wiper blade of the debris.

3 Claims, 6 Drawing Sheets

Fig. 4B ent application is a divisional application of patent
DEBRIS REMOVAL APPARATUS FOR A WIPER SYSTEM

CROSS-REFERENCE TO RELATED APPLICATIONS

The present application is a divisional application of patent application Ser. No. 11/873,577, filed on Oct. 17, 2007, which is now U.S. Pat. No. 7,891,042.

TECHNICAL FIELD

The present invention relates to wiper systems used in automotive applications for wiping glass surfaces, and more particularly to an apparatus which selectively lifts and then drops (i.e., shakes) the wiper arm of a wiper system in order to free debris trapped between the wiper blade and the glass surface.

BACKGROUND OF THE INVENTION

Motor vehicles are equipped with a wiper system having at least one wiper, wherein a wiper blade thereof wipes across glass surfaces in order to provide visibility for the occupants through the glass during periods of precipitation, or for cleaning of a glass surface. Wiper systems may employ one or more wipers (most commonly two) for the front windshield and, on some vehicles, one or more wipers for the rear window or windows. Indeed, some vehicles even have wipers for the headlights. What is typically common among wiper systems is an electronic control (manual switch or automatic) and one or more wipers interfaced with the electronic control, including an electric wiper motor, a wiper arm having a proximal end connected to the wiper motor, and a wiper blade assembly connected to a distal end of the wiper arm, wherein the wiper blade assembly carries an elastomeric wiper blade which wipes across the glass surface (typically in a reciprocating motion which pivots upon the wiper motor shaft) in squeegee fashion to wipingly remove debris and precipitation thereupon, and wherein the proximal end of the wiper arm includes an arm pivot which permits vertical movement of the wiper blade assembly toward and away from the glass surface, whereby a biasing spring associated with the wiper arm provides biasing of the wiper blade pressably onto the glass surface.

One annoying facet of the operation of wiper systems is when debris (which may be soluble, such as for example ice, or non-soluble, such as for example vegetation (in particular the stems of leaves), paper or dirt), gets trapped between the glass surface and the wiper blade. In such an instance, typically a streak (most often characterized as a water trail) appears on the glass surface after each wiping action due to the debris preventing wiping of the glass surface in the vicinity of its presence on the wiper blade. In order to rectify the situation, an occupant must exit the vehicle (when parked) and then manually shake the wiper arm by lifting and dropably releasing (i.e., letting the biasing spring to freely act on the wiper arm) the subject wiper arm (usually in a plurality of shake repetitions) in order to free the debris from the wiper blade. This manual procedure is unpleasant, especially when it must be performed during a time of heavy precipitation or at a location where standing beside the vehicle may present some hazard. Accordingly, it would be very advantageous if somehow a wiper blade could be freed of trapped debris without requiring manual removal.

In the prior art, U.S. Pat. No. 6,438,789B1, issued on Aug. 27, 2002 to Murawa et al., and assigned to the assignee hereof, describes an automatic wiper blade cleaning system which includes a nozzle body adapted to be disposed in the air intake plenum of a vehicle and connected to a source of fluid. The nozzle body has a nozzle that extends above a respective wiper blade in response to fluid pressure from the source of fluid to spray the fluid through the nozzle and onto the wiper blades to thereby clean the wiper blades. While this system works very well to remove ice and snow debris, which is dissolved by the fluid spray, it is less effective to remove non-soluble debris, such as the stem of a leaf trapped between the wiper blade and the glass surface.

Accordingly, what is needed in the art is a simple, effective and automatic debris removal apparatus for a wiper system that removes all kinds of debris, soluble and insoluble, which may be trapped between the wiper blade and the glass surface.

SUMMARY OF THE INVENTION

The present invention is a simple, effective and automatic debris removal apparatus for a wiper system that removes all kinds of debris, both soluble and insoluble, which may be trapped between the wiper blade and the glass surface by lifting the wiper blade off the glass surface and then causing the wiper blade to drop onto the glass surface, under urge of the biasing spring of the wiper arm, so as to thereby provide a shaking action which frees any trapped debris.

In a first embodiment of the present invention, an actuator is located at, preferably, each wiper at the pivoting portion of the wiper arm generally adjacent the pivot. In normal operation of the wiper system, the actuators are in a retracted state, whereby the wiper arms are free of contact with an actuator rod terminus of the respective actuator. In the event debris is trapped between a wiper blade and the glass surface, the operator of the vehicle initiates a wiper clean routine, as for example by pressing a switch, whereupon, pursuant to the wiper clean routine, the wiper arms assume a horizontally stationary position above their respective actuator, and the actuators cyclically actuate between a deployed state and the retracted state. During each of the one or more actuations of the actuators, the actuator rod terminus of the actuator pushes up upon the wiper arm causing the wiper arm to pivot and the wiper blade to become spaced from the glass surface, and then retracts quickly so that the biasing spring causes the wiper blade to drop upon the glass surface as a shake, whereupon any trapped debris is dislodged from the wiper blade.

In a second embodiment of the present invention, an actuator is located at, preferably, each wiper at the pivoting portion of the wiper arm generally adjacent the pivot, wherein the actuators each have a cam which is unidirectionally pivoting, and wherein the cam has a ramp portion and a drop portion. In normal operation of the wiper system, the actuators are in a retracted state, whereby the wiper arms are free of contact with the cams. In the event debris is trapped between a wiper blade and the glass surface, the operator of the vehicle initiates, as for example by pressing a switch, a wiper clean routine in which the actuators actuate to their deployed state such that the cams now interact with their respective wiper arm as the wiper arm moves across the glass surface in response to operation of its wiper motor. The cam cannot pivot as the wiper arm moves up the ramp portion of the cam, causing the wiper arm to pivot upwardly at its arm pivot, whereby the wiper blade becomes spaced from the glass surface. When the wiper arm encounters the drop portion of the cam, the biasing spring is allowed to now drop (preferably freely) the wiper blade upon the glass surface, whereupon any trapped debris is dislodged from the wiper blade by the shake. In the return pass of the wiper arm, the wiper arm encounters the drop portion of the cam, and the cam pivots to allow the wiper arm to move past without interference therefrom.

Accordingly, it is an object of the present invention to provide a simple, effective and automatic debris removal apparatus for a wiper system that removes all kinds of debris, both soluble and insoluble, which may be trapped between the wiper blade and the glass surface by lifting the wiper blade off the glass surface and then causing the wiper blade to drop onto the glass surface, under urge of the biasing spring of the wiper arm, so as to thereby provide a shaking action which frees any trapped debris.

This and additional objects, features and advantages of the present invention will become clearer from the following specification of a preferred embodiment.

DESCRIPTION OF THE PREFERRED EMBODIMENT

Referring now to the Drawing, FIGS. 1 through 4B depict features of a first embodiment of the present invention, and FIGS. 5 through 10C depict features of a second embodiment of the present invention, wherein it is to be understood that these embodiments are merely preferred and that other embodiments of the present invention are contemplated by the present invention in which the wiper arm of a wiper system is enabled to be raised and drop onto the glass surface as a shake, preferably repeatedly as a series of shakes, such as to shakingly remove soluble and insoluble debris as may be trapped between the wiper blade and the glass surface.

FIGS. 1 through 3A, 5 through 7B, 9A and 9B depict features of a conventional wiper system 100. At each wiper 104 of the wiper system 100, there is included an electric wiper motor 106 connected by its shaft 106s to the proximal end portion 108a of a wiper arm 108 and a wiper blade assembly 110 connected to a distal end portion 108b of the wiper arm, wherein the wiper blade assembly carries an elastomeric wiper blade 112 which wipes across the glass surface 114 in squeegee-like fashion to wipingly remove debris and precipitation laying thereon, and wherein an arm pivot 108p defines a fixed arm portion 108c (in this example being identical with the proximal end portion 108a) of the wiper arm and a pivotal arm portion 108d of the wiper arm, whereby the arm pivot provides vertical movement of the wiper blade assembly toward and away from the glass surface, whereby a biasing spring 116 associated with the wiper arm biases of the wiper blade pressably toward (onto) the glass surface 114. In operation, when the wiper motors are actuated, the respective wiper arms reciprocate across the surface to be wiped, the speed of reciprocation being determined by an electronic circuit.

Figure 1:
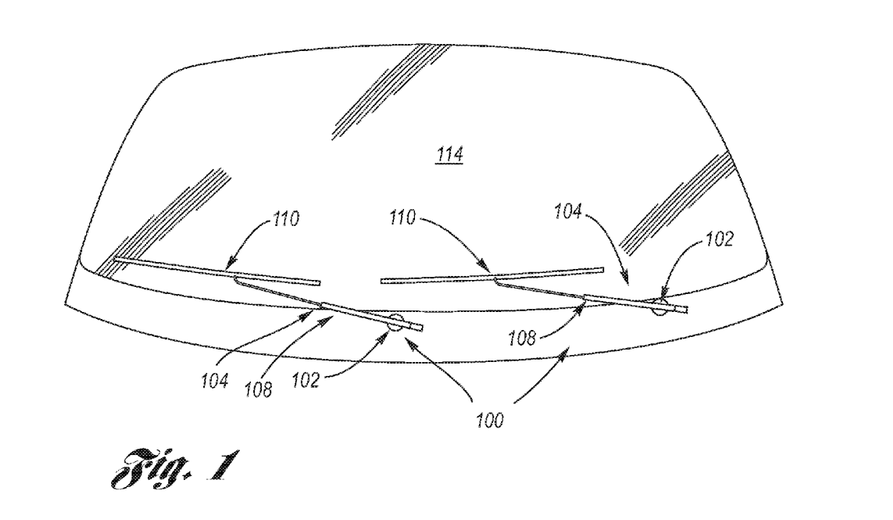
FIG. 1 is an elevational view of a motor vehicle windshield and wiper system, wherein an automatic debris removal apparatus according to a first embodiment of the present invention is disposed at each wiper of the wiper system.
Figure 2:
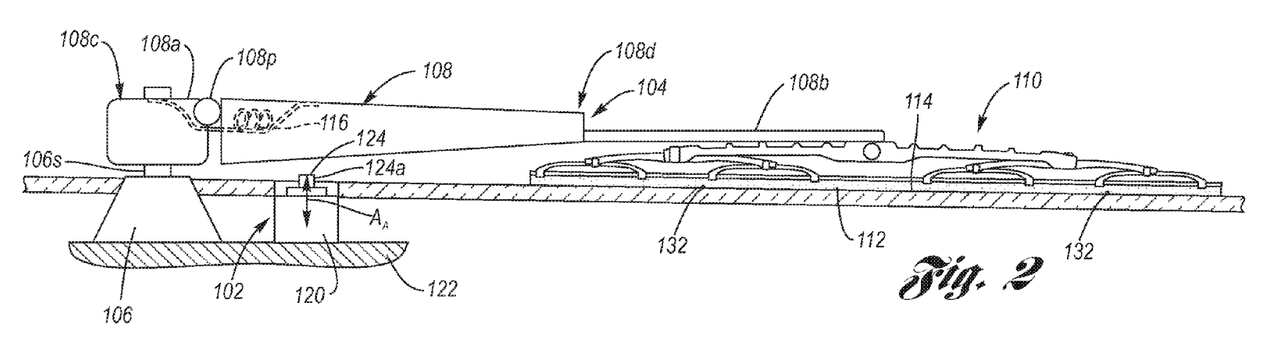
FIG. 2 is a partly sectional side view of a wiper of the wiper system of FIG. 1, wherein the actuator of the automatic debris removal system is at a retracted state thereof.
Figure 3:
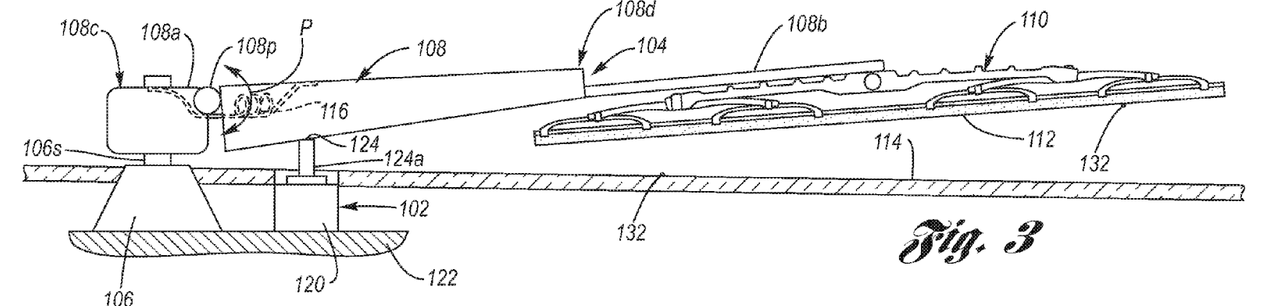
FIG. 3 is a partly sectional side view of the wiper of FIG. 2, wherein now the actuator of the automatic debris removal system is at a deployed state thereof.

Referring now to the first embodiment of the present invention, an automatic debris removal apparatus 102 is preferably interfaced with each wiper 104 (alternatively for example, there may only be one actuator located at the driver's side wiper, being absent at the passenger's side wiper). The automatic debris removal apparatus 102 includes, at each wiper so equipped, an actuator 120 (as for example a piston-cylinder combination) which is preferably electrically actuated, but may be operated otherwise as for example hydraulically, wherein the actuator is operably extensible/retractable along an actutation axis $A_A$ between a retracted state (as shown at FIG. 2) and a deployed state (as shown at FIG. 3). The preferred disposition of the actuator 120 is generally adjacent the arm pivot 108p beneath the pivotal arm portion 108d of the wiper arm 108. The actuator 120 is secured to a structural member 122 in a manner known in the art and is further connected to a source of electricity or pressurizable fluid in a manner also known in the art. The actuator 120 has an actuator rod 124a having an actuator rod terminus 124 adapted to abutably engage the wiper arm 108 directly thereabove when in the deployed state.

In normal operation of the wiper system 100, the wipers are actuated, as for example automatically by a moisture sensor 126 or manually by a switch 128 through an electronic control module 130 which has programmed wipe modes for the electric motors. The actuators 120 of the automatic debris removal system 102 are in the retracted state of FIG. 2, whereby the wiper arms 108 are free of contact with the actuator rod terminus 124 of their respective actuator as they wipe across the glass surface 114.

Figure 3A:
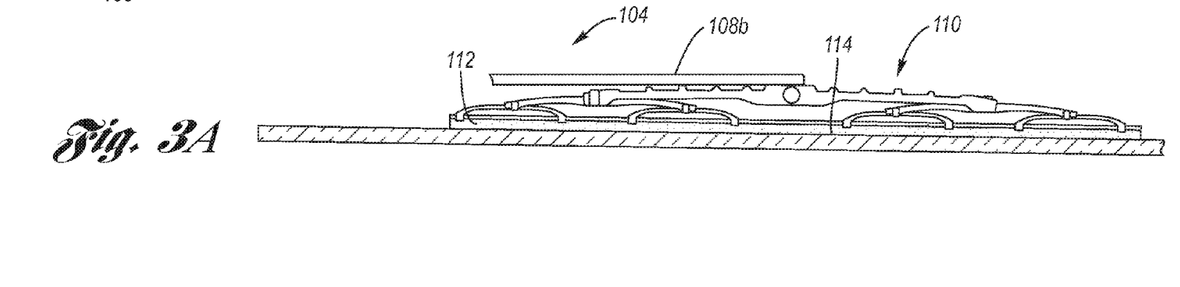
FIG. 3A is a partly broken-away view as in FIG. 2, now showing for illustrative purposes the debris of FIG. 2 removed as a result of operation of the automatic debris removal system.

In the event debris 132 (see FIG. 2) is/are trapped between a wiper blade 112 and the glass surface 114, the operator of the vehicle initiates a wiper clean routine (see FIG. 4B), as for example by pressing a switch 134 in which the wiper arms 108 assume a horizontally stationary position above their respective actuators 120 as for example determined by a wiper arm position sensor 136, whereupon the actuators are actuated to cycle between the retracted state of FIG. 2 and the deployed state of FIG. 3, such that the actuator rod terminus 124 pushes up upon the pivotal arm portion 108d of the wiper arm, thereby causing the pivotal arm portion to pivot (see arrows P) and the wiper blade to become spaced from the glass surface, as shown at FIG. 3. It is preferred that during the actuation cycle, the actuator rod terminus retract quickly so that the biasing spring 116 will cause the wiper blade to drop strikingly upon the glass surface as a shake (analogous to the manual manner of shaking described hereinabove) in order to shake off (i.e., knock loose or break up) any debris stuck to the wiper blade or stuck to the glass surface (as indicated at FIG. 3), whereupon any trapped debris is dislodged from the wiper blade, as shown at FIG. 3A. In this regard it is preferred for a predetermined number of shake cycles to be performed, as for example 3 to 5 cycles.

Figure 4A:
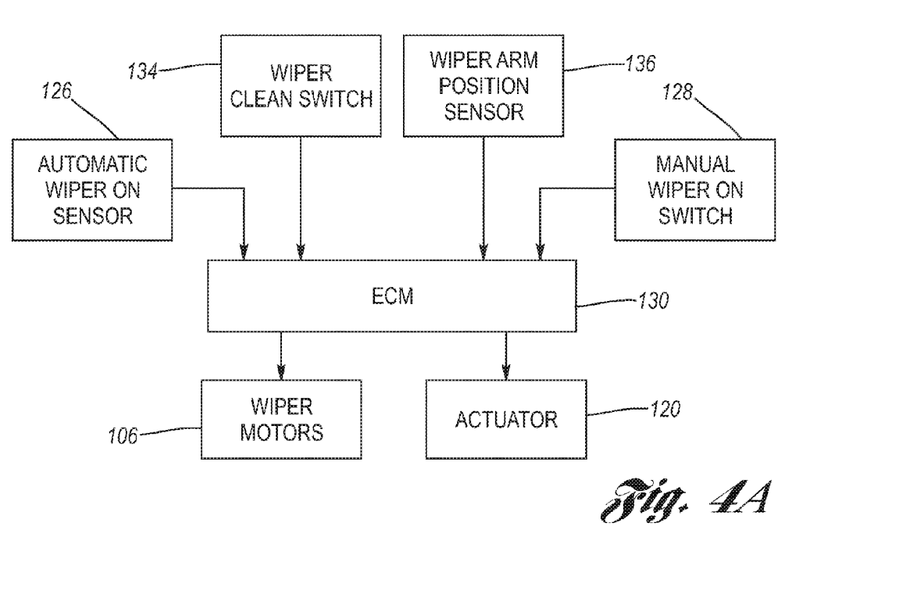
FIG. 4A is an example of an electronic diagram of a wiper system incorporating the automatic debris removal system according to the first embodiment of the present invention.
Figure 4B:
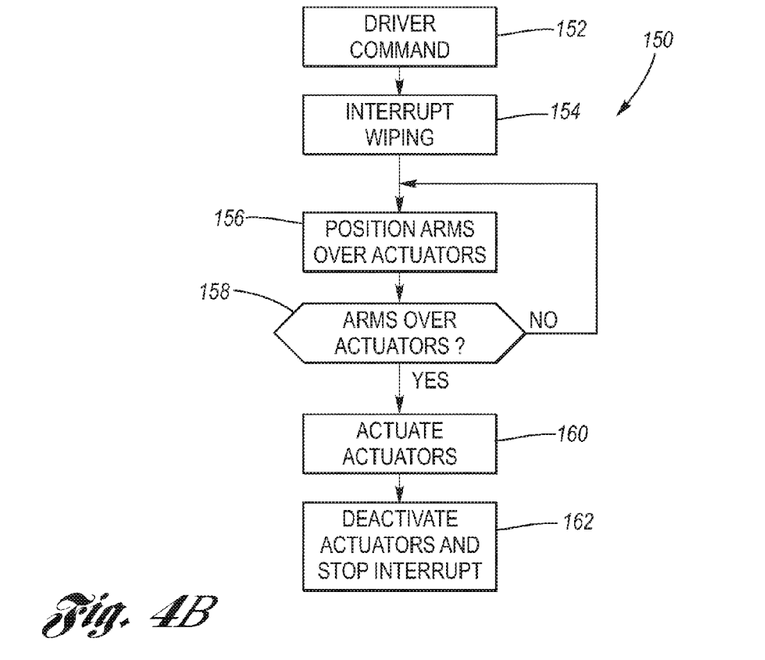
FIG. 4B is an example of an algorithm for implementing the first embodiment of the present invention.

FIG. 4B depicts an example of an actuation algorithm 150 for implementing the first preferred embodiment of the present invention. The algorithm may be contained in any electronic control module of the vehicle (i.e., ECM 130) and is electronically interfaced with the wiper system electronics of the vehicle (i.e., FIG. 4A). At Block 152 command is received from the driver that automatic debris removal is requested. At Block 154, the program interrupts the wiper system electronics control of the wiper system. At Block 156 the program directs the wiper motors to position the wiper arms directly above their respective actuators and remain there, wherein at Decision Block 158, the wiper arm position sensor assures correct placement of the wiper arms. At Block 160, the actuators are sent a command to actuate through a predetermined number of shake cycles (i.e., between 3 and 5 cycles, for example). At Block 162, with the actuators at the retracted state, control is passed back to the wiper system electronics.

Figure 5:
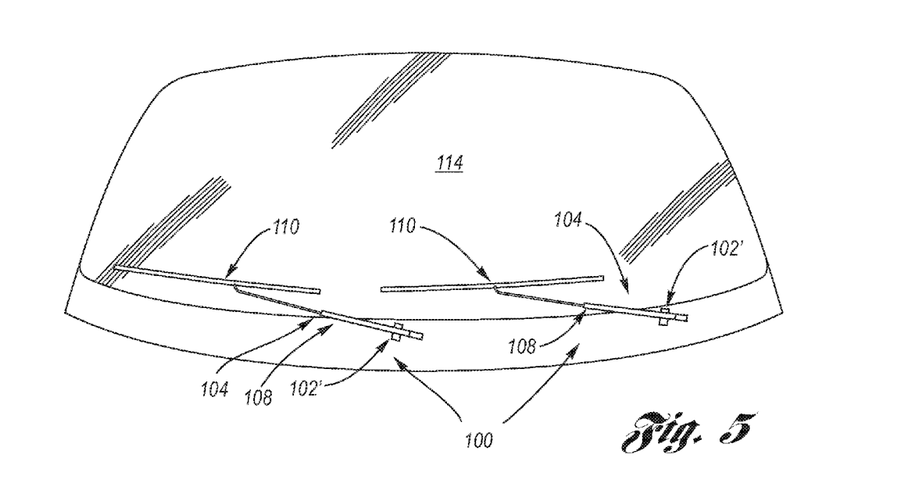
FIG. 5 is an elevational view of a motor vehicle windshield and wiper system, wherein an automatic debris removal apparatus according to a second embodiment of the present invention is disposed at each wiper of the wiper system.

Referring next to FIGS. 5 though 10B, the second embodiment of the automatic debris removal system 102' according to the present invention will be detailed, wherein the above described conventional wiper system 100 is utilized, and wherein like functioning parts have identical numbering and similar but modified parts have identical numbering with a prime.

Figures 6, 7A:
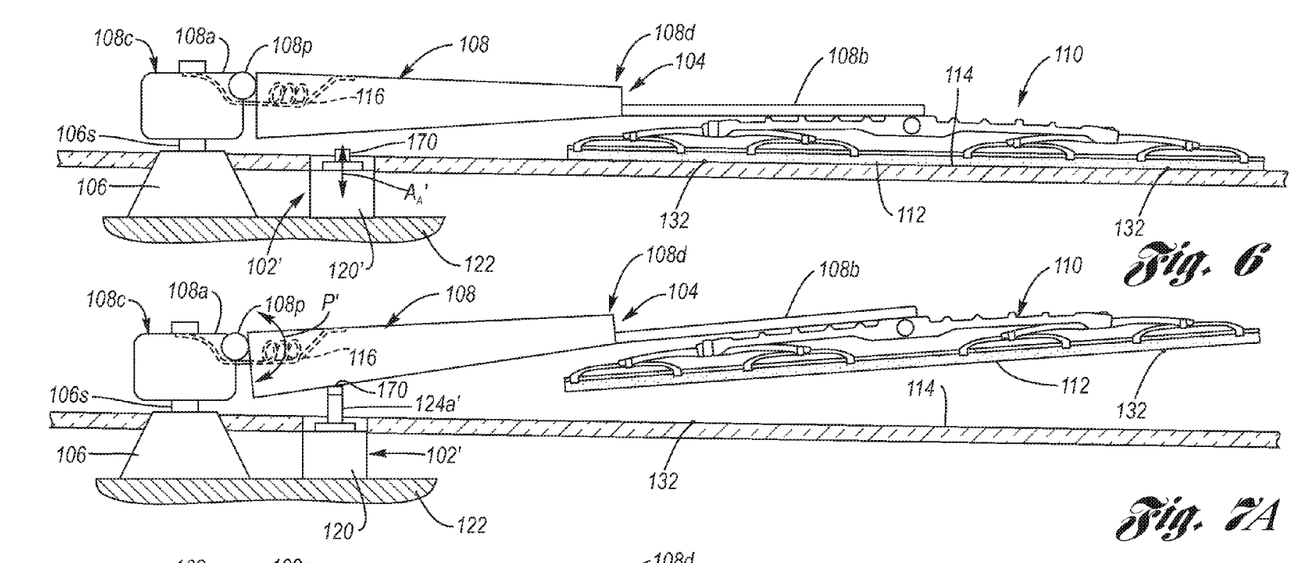
FIG. 6 is a partly sectional side view of a wiper of the wiper system of FIG. 5, wherein the actuator of the automatic debris removal system is at a retracted state thereof.
FIG. 7A is a partly sectional side view of the wiper of FIG. 6, wherein now the actuator of the automatic debris removal system is at a deployed state thereof, and wherein the cam is non-pivoted during interaction with the wiper arm.
Figure 7B:
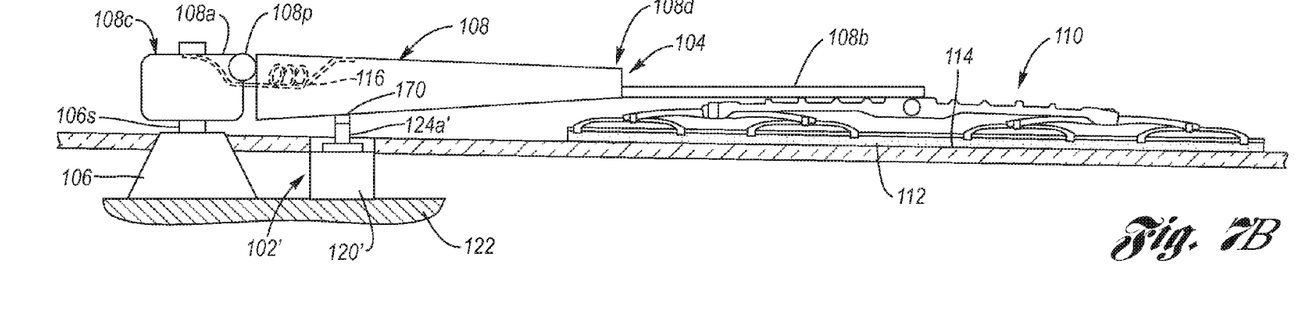
FIG. 7B is a partly sectional side view of the wiper of FIG. 6, wherein now the actuator of the automatic debris removal system is at a deployed state thereof, wherein the cam is pivoted during interaction with the wiper arm, and wherein, for illustrative purposes, the debris of FIG. 6 has been removed by operation of the automatic debris removal system.

The automatic debris removal apparatus 102' is preferably interfaced with each wiper 104 (alternatively for example, there may only be one actuator located at the driver's side wiper, being absent at the passenger's side wiper). The automatic debris removal apparatus 102', at each wiper, includes an actuator 120' (as for example a piston-cylinder combination) which is preferably electrically actuated, but may be operated otherwise as for example hydraulically, wherein the actuator is operably extensible/retractable along an actutation axis $A_A'$ between a retracted state (shown at FIG. 6) and a deployed state (as shown at FIGS. 7A and 7B). As in the first embodiment, the preferred disposition of the actuators 120' is generally adjacent the pivot 108p beneath the pivotal arm portion 108d of the respective wiper arm 108. The actuators 120' are secured to a structural member 122 in a manner known in the art and is further connected to a source of electricity or pressurizable fluid in a manner also known in the art. Differing from the first embodiment, each actuator 120' has a cam 170 connected to the actuator rod 124a adjacent the actuator rod terminus 124' which is unidirectionally pivoting on a cam pivot 172, wherein the cam has a ramp portion 170a and a drop portion 170b. A cam spring 174 biases the cam to its unpivoted state (see FIG. 8A) from its pivoted state (see FIG. 8B). A boss 176 on the actuator rod adjacent the actuator rod terminus interferes selectively with the cam 170, resulting in the unidirectional pivoting of the cam.

In normal operation of the wiper system 100, the actuators 120' of the automatic debris removal system 102' are in the retracted state of FIG. 6, whereby the wiper arms 108 are free of contact with the cams 170 of the respective actuators 120'.

Figures 10A, 10B, 10C:
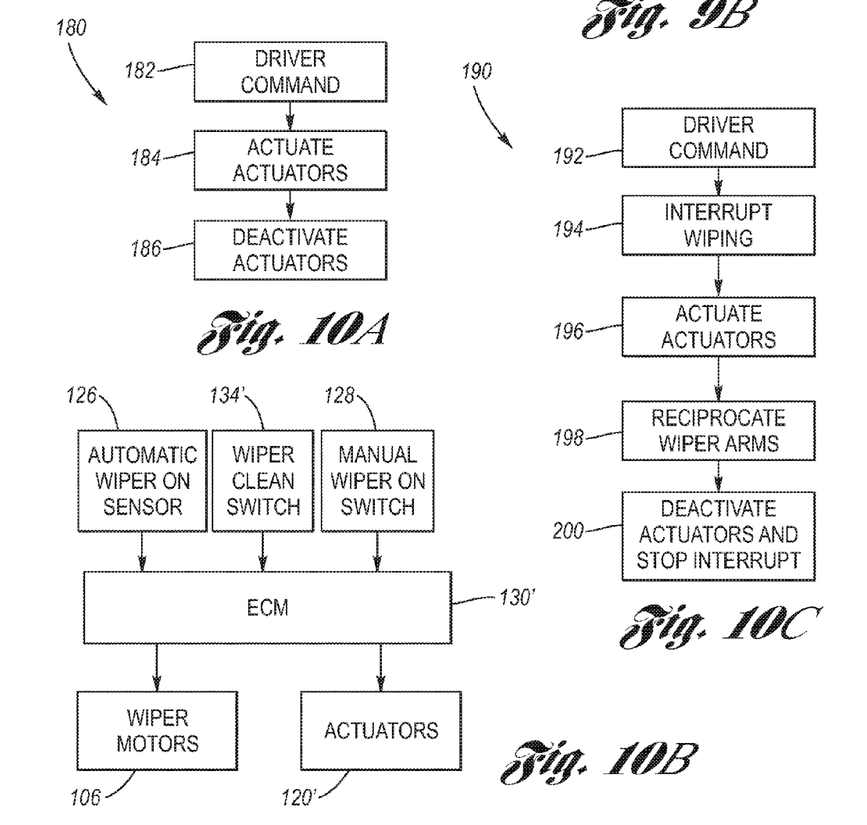
FIG. 10A is an example of an algorithm for implementing a first aspect of the second embodiment of the present invention.
FIG. 10B is an example of an electronic diagram of a wiper system incorporating the automatic debris removal system according to a second aspect of the second embodiment of the present invention.
FIG. 10C is an example of an algorithm for implementing the second aspect of the second embodiment of the present invention.

In the event debris 132 (see FIG. 6) is/are trapped between a wiper blade 112 and the glass surface 114, the operator of the vehicle initiates a wiper clean routine, which routine, according to a first aspect of the second embodiment, may be independent of the wiper system electronics in that the wiper system reciprocates normally during cleaning, or may be interfaced with the wiper system electronics according to a second aspect of the second embodiment (see FIGS. 10A and 10B).

Figure 8A:
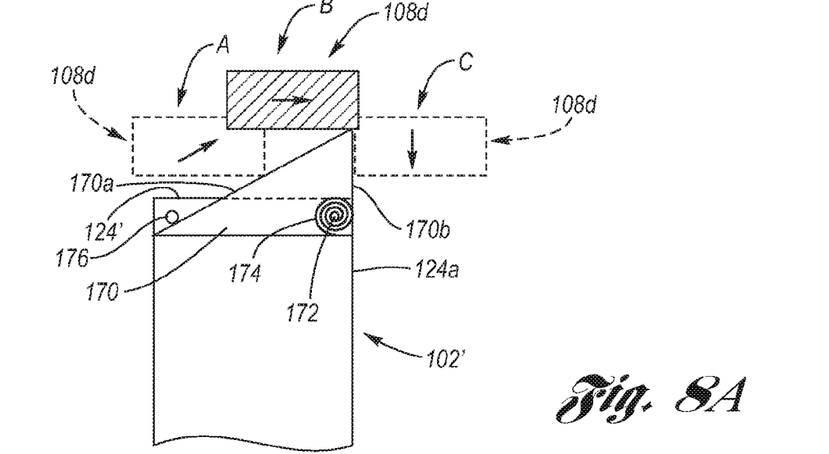
FIG. 8A is a partly sectional side view of a wiper arm of the wiper system of FIG. 5, wherein the actuator of the automatic debris removal system is at its deployed state of FIG. 7A with the wiper arm moved to the highest point of the ramp portion of the cam.
Figure 8B:
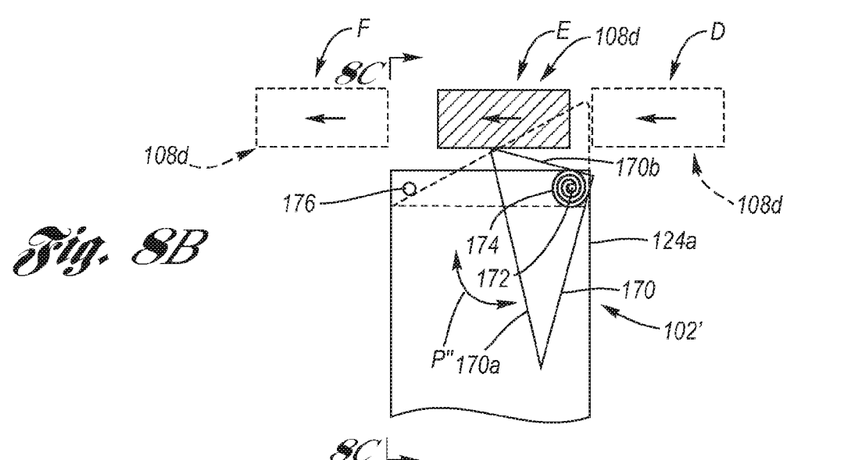
FIG. 8B is a partly sectional side view of a wiper arm of the wiper system of FIG. 5, wherein the actuator of the automatic debris removal system is at its deployed state of FIG. 7B with the wiper arm having caused the cam to pivot out of its way.
Figure 8C:
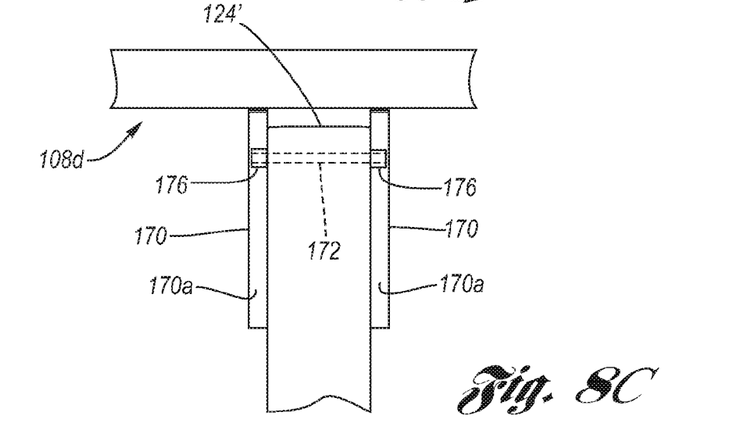
FIG. 8C is a sectional view seen along line 8C-8C of FIG. 8B.
Figure 9A:
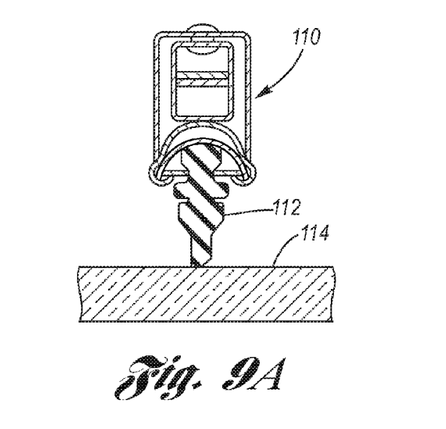
FIG. 9A is a sectional view of a wiper blade assembly of FIG. 5, showing the wiper blade in relation to the glass surface, wherein the wiper arm is at positions A and C of FIG. 8A and positions D, E and F of FIG. 8B.
Figure 9B:
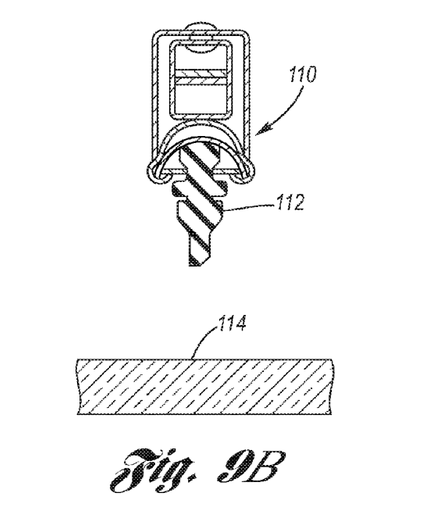
FIG. 9B is a sectional view of the wiper blade assembly as in FIG. 9A, now showing the wiper blade in relation to the glass surface, wherein the wiper arm is at position B of FIG. 8A.

The wiper clean routine actuates the actuators 120' so that they assume the deployed state, whereupon the cams 170 now interact with their respective wiper arm 108 as the wiper arms move reciprocally (in first and oppositely second directions) across the glass surface in response to operation of the wiper motors. Since each cam 170 cannot pivot as the wiper arm moves in the first direction and up the ramp portion 170a from position A to position B in FIG. 8A because of interference by the boss 176, the pivotable arm portion 108d of the wiper arm pivots (see arrows P') and the wiper blade becomes spaced from the glass surface until a maximum height ramp location is attained at position B and the wiper blade is maximally spaced from the glass surface, as shown at FIG. 9B. With further movement in the first direction of the reciprocation of the wiper arm by the wiper motor, the wiper arm encounters the drop portion 170b, whereupon the biasing spring 116 causes the wiper blade to drop shakingly (strikingly) upon the glass surface to shake off (i.e., knock loose or break up) any debris stuck to the wiper blade or stuck to the glass surface (as indicated at FIG. 7A), whereby any trapped debris is dislodged from the wiper blade. In the return second direction of the reciprocation of the wiper arms in which the wiper arms move opposite to the first direction, the wiper arms encounter the drop portion of each respective cam 170, but the cam is able to pivot (see arrows P") due to a force from this direction overcoming the biasing of the cam spring 174, such that the cam will now pivot to allow the wiper arm to pass thereover without interference, as shown at FIG. 8B.

FIG. 10A depicts an example of an algorithm for implementing the first aspect of the second embodiment of the present invention, wherein the wiper system electronics are independent of the debris removal system 102'. At Block 182, the driver inputs a command (i.e., presses a switch), which at Block 184 causes the actuators 120' to assume their deployed state. After a predetermined time (sufficient to allow, for example 3 to 5 passes (providing 3 to 5 shake cycles) of the wiper arm thereover), at Block 186 the actuators are returned to the retracted state.

FIGS. 10B and 10C depict an example of an implementation of the second aspect of the second preferred embodiment of the present invention. The algorithm 190 of FIG. 10C may be contained in any electronic control module (i.e., ECM 130') of the vehicle and is electronically interfaced with the wiper system electronics (see FIG. 10B) of the vehicle.

At Block 192, command is received from the driver that automatic debris removal is requested (i.e., via pressing of switch 134'). At Block 194, the program interrupts the wiper system electronics control of the wiper system. At Block 196, the actuators are sent a command to actuate to the deployed state. At Block 198, the program directs the wiper motors to move the wiper arms reciprocally in the first and second directions of movement (i.e., back and forth) across the cams a predetermined number of times (for example, 3 to 5 passes providing 3 to 5 shake cycles), wherein each direction of movement of the reciprocation is localized with respect to the cams, being just a little distance on either side of the respective cams, much smaller than the full reciprocation of the wiper arms, thereby rendering a quick succession of wiper blade shakes. At Block 200, with the actuators at the retracted state, control is passed back to the wiper system electronics.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A wiper system for wiping a surface, comprising:
   a wiper comprising:
      a wiper motor;
      a wiper arm connected to said wiper motor, said wiper arm having a fixed arm portion and a pivotal arm portion; and
      a wiper blade connected to said pivotal arm portion in wiping relation with respect to the surface; and
   a debris removal apparatus comprising an actuator actuable between a deployed state and a retracted state, wherein when said actuator is actuated to said deployed state, said actuator causes said pivotal arm portion to be pivoted such that said wiper blade is separated from the surface;
   wherein said motor operates to move the wiper arm over a range of reciprocation with respect to the surface; said actuator further comprising:
      an actuator rod extensible and retractable by said actuator; and
      a cam pivotally connected to said actuator rod, wherein said cam has a ramp portion and a drop portion, and wherein said cam is non-pivotal with respect to said actuator rod when a force is applied thereto along a first direction by said wiper arm, but is pivotal with respect to said actuator rod when a force is applied thereto along a second direction by said wiper arm opposite to said first direction;
   wherein when said actuator is at said deployed state and said wiper motor is operating such that said wiper arm is moving in said first direction, said wiper arm encounters said cam and slides on said ramp portion whereupon said wiper blade separates from the surface, and then allows said wiper arm to drop when said drop portion is encountered whereupon said wiper blade strikes the surface; and
   wherein when said actuator is at said deployed state and said wiper motor is operating such that said wiper arm is moving in said second direction, said wiper arm encounters said drop portion of said cam whereupon said cam pivots in relation to said actuator rod such that said wiper blade remains in wiping relation to the surface.

2. The system of claim 1, further comprising an electronic control circuit interfaced with said wiper motor and said actuator which when said actuator is at said deployed state reciprocates said wiper arm locally with respect to said cam so as to thereby shake the wiper blade with respect to the surface during each reciprocation.

3. An apparatus for removing debris between a biased wiper arm supported wiper blade and a surface wiped by the wiper blade, comprising:
   an actuator actuable between a deployed state and a retracted state, wherein when said actuator is actuated to said deployed state, said actuator causes the wiper blade to be separated from the surface;
   wherein said actuator further comprises:
      an actuator rod extensible and retractable by said actuator; and
      a cam pivotally connected to said actuator rod, wherein said cam has a ramp portion and a drop portion, and wherein said cam is non-pivotal with respect to said actuator rod when a force is applied thereto along a first direction by said wiper arm, but is pivotal with respect to said actuator rod when a force is applied thereto along a second direction by said wiper arm opposite to said first direction;
   wherein when said actuator is at said deployed state and the wiper blade is moving in said first direction, said cam separates the wiper blade from the surface when contacted by said wiper arm and then allows the wiper arm to drop when said drop portion is encountered whereupon said wiper blade strikes the surface; and
   wherein when said actuator is at said deployed state and the wiper blade is moving in said second direction, said cam pivots in relation to said actuator rod when contacted by said wiper arm such that the wiper blade remains in wiping relation to the surface.

* * * * *